(12) United States Patent
Coney

(10) Patent No.: US 9,794,789 B1
(45) Date of Patent: *Oct. 17, 2017

(54) PROXIMITY-BASED SYSTEM THAT SECURES LINKED WIRELESS-ENABLED DEVICES

(71) Applicant: Lillie Bruce Coney, Beaumont, TX (US)

(72) Inventor: Lillie Bruce Coney, Beaumont, TX (US)

(73) Assignee: Bruce Corporation, Beaumont, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/331,583

(22) Filed: Oct. 21, 2016

Related U.S. Application Data

(63) Continuation of application No. 14/819,360, filed on Aug. 5, 2015, now Pat. No. 9,503,902.

(Continued)

(51) Int. Cl.
*H04W 12/06* (2009.01)
*H04W 12/08* (2009.01)
(Continued)

(52) U.S. Cl.
CPC ........... *H04W 12/08* (2013.01); *H04W 4/021* (2013.01); *H04W 12/06* (2013.01); *H04W 76/02* (2013.01)

(58) Field of Classification Search
CPC ..... H04W 12/06; H04W 12/12; H04W 64/00; H04W 88/02

(Continued)

(56) References Cited

U.S. PATENT DOCUMENTS

| 5,101,476 A | 3/1992 | Kukla |
| 5,757,916 A | 5/1998 | MacDoran |

(Continued)

FOREIGN PATENT DOCUMENTS

| CN | 101896914 | 11/2010 |
| CN | 105993157 | 10/2016 |

(Continued)

OTHER PUBLICATIONS

United States Patent and Trademark Office; International Search Report and Written Opinion PCT/US2013/075860; Mar. 31, 2014, 12 Pages.

(Continued)

*Primary Examiner* — Sam Bhattacharya
(74) *Attorney, Agent, or Firm* — Schwabe, Williamson & Wyatt P.C.

(57) ABSTRACT

The proliferation of networked, wireless-enabled devices is challenged by the reliance upon password management and user knowledge of privacy and security techniques to maintain control over data that is personal, proprietary or restricted. This disclosure enables a geo-proximity security and privacy system for assuring control and non-repudiation for wireless-enabled devices by relying upon location and trusted network relationships among a set of wireless-enabled devices, where one or more devices may act as a control or master key. Security in a digital society may be benefitted by the establishment of digital walls that are as flexible as the world of cyberspace to be erected whenever and wherever wireless-enabled technology is in use. The security protocol may be configured to secure a protected device or the data they contain from loss, theft, abuse or misuse.

15 Claims, 7 Drawing Sheets

Related U.S. Application Data

(60) Provisional application No. 62/034,088, filed on Aug. 6, 2014.

(51) Int. Cl.
*H04W 4/02* (2009.01)
*H04W 76/02* (2009.01)

(58) Field of Classification Search
USPC .......... 455/410, 411, 456.1–456.3; 340/5.74, 340/539.12, 541, 932.2
See application file for complete search history.

(56) References Cited

U.S. PATENT DOCUMENTS

| | | |
|---|---|---|
| 6,336,900 B1 | 1/2002 | Alleckson |
| 6,381,577 B1 | 4/2002 | Brown |
| 6,402,691 B1 | 6/2002 | Peddicord |
| 7,088,233 B2 | 8/2006 | Menard |
| 7,142,167 B2 | 11/2006 | Rochelle |
| 7,148,791 B2 | 12/2006 | Grisham |
| 7,353,179 B2 | 4/2008 | Ott |
| 7,656,291 B2 | 2/2010 | Rochelle |
| 7,786,876 B2 | 8/2010 | Troxler |
| 8,018,329 B2 | 9/2011 | Morgan |
| 8,255,238 B2 | 8/2012 | Powell |
| 8,258,965 B2 | 9/2012 | Reeder |
| 8,320,931 B2 | 11/2012 | Ward |
| 8,508,336 B2 | 8/2013 | Giobbi |
| 8,509,806 B2 | 8/2013 | West |
| 8,581,712 B2 | 11/2013 | Morgan |
| 8,740,790 B2 | 6/2014 | Iliff |
| 8,894,577 B2 | 11/2014 | Reed |
| 9,015,008 B2 | 4/2015 | Geva |
| 9,113,300 B2 | 8/2015 | Marti |
| 9,119,034 B2 | 8/2015 | Meredith |
| 9,285,484 B2 | 3/2016 | Shima |
| 9,299,102 B1 | 3/2016 | Pike |
| 9,473,890 B1 | 10/2016 | Liu |
| 9,538,329 B1 | 1/2017 | Vivathana |
| 9,565,523 B1 | 2/2017 | Steger |
| 2006/0017563 A1 | 1/2006 | Rosenfeld |
| 2006/0181424 A1 | 8/2006 | Graves |
| 2006/0183980 A1 | 8/2006 | Yang |
| 2006/0277075 A1 | 12/2006 | Salwan |
| 2006/0288095 A1 | 12/2006 | Torok |
| 2008/0262867 A1 | 10/2008 | Bayne |
| 2009/0206992 A1 | 8/2009 | Giobbi |
| 2009/0299770 A1 | 12/2009 | Martinez |
| 2011/0202371 A1 | 8/2011 | Darguesse |
| 2012/0172050 A1* | 7/2012 | Ledlie .............. H04W 4/022 455/456.1 |
| 2013/0072226 A1 | 3/2013 | Thramann |
| 2013/0217332 A1 | 8/2013 | Altman |
| 2013/0316645 A1 | 11/2013 | Li |
| 2013/0331118 A1 | 12/2013 | Chhabra |
| 2013/0332197 A1 | 12/2013 | Hinkel |
| 2014/0122396 A1 | 5/2014 | Swaminathan |
| 2014/0201075 A1 | 7/2014 | King |
| 2014/0278545 A1 | 9/2014 | Andrews |
| 2014/0371617 A1 | 12/2014 | Muradia |
| 2014/0379368 A1 | 12/2014 | Kim et al. |
| 2015/0201306 A1 | 7/2015 | Kazemi |
| 2015/0310173 A1 | 10/2015 | Coney |
| 2016/0077186 A1 | 3/2016 | Snapp |
| 2016/0147968 A1 | 5/2016 | Coney |
| 2016/0217519 A1 | 7/2016 | Kozat |
| 2016/0381543 A1 | 12/2016 | Zhang |
| 2017/0041315 A1 | 2/2017 | Giobbi |
| 2017/0099584 A1 | 4/2017 | Bhanot |

FOREIGN PATENT DOCUMENTS

| | | |
|---|---|---|
| WO | 2014100036 | 6/2014 |
| WO | 2015155495 | 10/2015 |

OTHER PUBLICATIONS

Michael J. Covington et al.; "Securing Context-Aware Applications Using Environment Roles"; Georgia Institute of Technology; Atlanta, Georgia; May 2001; 11 pages.

Michael J. Covington et al.; "A Context Aware Security Architecture for Emerging Applications"; Georgia Institute of Technology; 6th ACM Symposium on Access Control Models and Technologies; Chantilly, Virginia, May 2001; 10 pages.

Indrakshi Ray et al; "A Location-Aware Role-Based Access Control Model"; Second International Conference ICISS; Kolkata, India; Dec. 2006; 15 pages.

Geetanjali Sampemane et al.; "Access Control for Active Spaces"; Department of Computer Science, University of Illinois at Urbana-Champaign; ACSAC '02 Proceedings of the 18th Annual Computer Security Applications Conference; Las Vegas, NV; Dec. 2002; 10 pages.

Urs Hengartner et al.; "Access Control to People Location Information"; University of Waterloo, Ontario, CA; ACM Transactions on Information and System Security; vol. 8 Issue 4, Nov. 2005; New York, NY; 30 pages.

Elisa Bertino et al; "A Spatially Aware RBAC"; SACMAT '05 Proceedings of the 10th ACM Symposium on Access Control Models and Technologies; Stockholm Sweden; Jun. 2005; 37 pages.

Denning and Macdoran; "Location-Based Authentication: Grounding Cyberspace for Better Security"; Computer Fraud and Security, Feb. 1996; Elsevier Science Ltd; pp. 12-16.

\* cited by examiner

PROXIMITY-BASED SYSTEM THAT SECURES LINKED WIRELESS-ENABLED DEVICES

RELATED APPLICATIONS

This application is a continuation of U.S. Non-provisional patent application Ser. No. 14/819,360, entitled "PROXIMITY-BASED SYSTEM THAT SECURES LINKED IP ENABLED DEVICES," filed Aug. 5, 2015, which is a non-provisional of U.S. Provisional Patent Application No. 62/034,088 filed Aug. 6, 2014, both of which are incorporated herein by this reference.

COPYRIGHT NOTICE

© 2014 Lillie Coney. A portion of the disclosure of this embodiment document contains material, which is subject to copyright protection. A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR §1.71(d).

TECHNICAL FIELD

This invention pertains to security and more specifically to controlling access to secured locations or information based on locations of linked, wireless-enabled devices.

BACKGROUND

The proliferation of digital devices and the desire to prevent theft, abuse or misuse of information accessible by a device has imposed a password management regime upon consumers that is challenging their ability to develop and maintain control over wireless-enabled, networked technology. Social and economic dependence upon complex password management by individual consumers who are faced with an exponentially expanding number of consumer wireless-enabled devices is unsustainable.

The next technology wave is fast approaching in the form of the "Internet of things," where the lives of consumers/workers/citizens will be delinked from fixed geographic locations. The power of digital devices has made work, learning, play, and healthcare services available at any location where a person with the right technology is present. Due to advances in RFID technology, the adoption of Internet Protocol version 6 ("IPV6"), the development of near field communication, continued miniaturization of computing technology, broad and sustained adoption of mobile wireless technology (means of supporting wireless communication), innovations in microchip technology, and software engineering, many consumer and commercial products, appliances and equipment have a unique Internet Protocol address, whereby one device is distinguishable from another. Indeed, IPV6 arises by necessity as the sheer number of addresses outstrips the IPV4 protocol. This proliferation of nodes compounds the security challenges.

SUMMARY

The following is a summary of the present disclosure in order to provide a basic understanding of some aspects of the disclosure. The summary is not intended to identify key/critical elements of the disclosure or delineate the scope of the disclosure. Its sole purpose is to present some concepts of the disclosure in a simplified form as a prelude to the more detailed description that is presented later.

This disclosure describes methods and apparatuses of a security system for protecting wireless-enabled devices and/or associated data from theft, loss, misuse, and abuse. This goal may be achieved through, but not limited to, the creation of a relationship between or among devices through a link, where the relationship may be associated with the physical proximity of the devices to each other. The methods and apparatuses described may comprise, but are not limited to, the use of a central programming device located within physical proximity of a wireless-enabled device or devices. The central programming device may be utilized to enroll devices and assign relationships between the devices, as well as assign levels of security and corresponding protocol(s) to the devices to be utilized in the case that one or more of the enrolled devices become separated from other enrolled devices within the same linked group.

The central programming device may act as a controller of enrolled devices, which means it can assign links among devices (for example, using Classless Inter-Domain Routing or CIDR) such that the linked devices share a unique access security protocol. The central programming device may be able to, but is not limited to: establishing parameters for device access and use; assigning levels of functionality to linked devices; setting proximity distances that linked devices may be separated from each other without activating the security protocol; and facilitating escalation of the levels of response if distance parameters exceed the set proximity distances. In some examples, the central programming device may be limited to operation at a location where the central programming device was initialized. This limiting of operation provides an additional layer of security to better manage access, use, and functionality of wireless-enabled technology located in a home, office or elsewhere.

In some embodiments, the central programming device may implement a secure home area network, functioning as a proprietary GPS system that may monitor the presence, condition, and location of linked devices. The central programming device may be configured to allow a user to enroll linked devices, establish proximity relationships, and manage information related to changes in proximity relationships between the linked devices in order to facilitate a user being able to locate an item. This may assist users by helping them to locate and retrieve items, as well as determine that a linked device exceeded the bounds of its proximity relationship.

The central programming device may comprise or have access to a storage unit for storing information related to each linked device, and it may securely transmit stored information based on owner established protocols. The protocols may cause the central programming device to perform actions, including sending information to linked devices to alert an owner or controller of the device, a home/business security service, a friend or a family member, or contact 911 emergency services in response to one or more enrolled device(s) violating proximity relationships or other operational rules. The central programming device may also assign or delegate controlling functions to a linked device, which configures the linked device to perform specified operations in response to a violation of security protocols. The central programming device may be integrated with home or office security systems, enable automated enrollment and/or generate a log of devices that enter the communicable area (within wireless communication range)

of the central programming device. The central programming device may be configured to operate with bar-coded devices readers and other IP enabled technology in appliances or office equipment.

The central programming device may generate white noise in the form of False RFID or simulated wireless communication signals to mask the active communication or presence of wireless-enabled devices within its range. The central programming device may be able to generate, or simulate, wireless communication to a degree necessary to prevent interception of the wireless communication through electronic eavesdropping, thereby supporting privacy and security.

Electronic communications among authorized, linked devices may be enabled when the linked devices are within a physical proximity to the central programming device. In some examples, communication relationships may be established for linked devices even though at least one of the devices is outside the physical proximity to the central programming device or is violating another rule assigned to the linked devices.

The wireless-enabled devices may be managed and monitored securely when outside of the physical proximity of the central programming device. In some examples, the central programming device may communicate with the linked devices while they are outside of the physical proximity.

The central programming device may be able to identify, track, and manage non-wireless-enabled items by tracking an RFID tag, or similarly operating technology, attached to the items. The non-wireless-enabled items may be linked to other items and wireless-enabled devices, and may operate similarly to wireless-enabled devices that have been linked to other wireless-enabled devices.

The central programming device may utilize RFID, internet protocol (IP), near field communication, wi-fi, or any other type of wireless communication now known or later developed to perform the disclosed operations. Further, the central programming device may alternate between communication protocols for communication with devices that require a particular type of communication protocol. For example, if one device requires RFID communication and a second device requires IP communication, the central programming device may be able to utilize the corresponding communication protocol to communicate with both devices.

Additional aspects and advantages of this disclosure will be apparent from the following detailed description, which proceeds with reference to the accompanying drawings.

BRIEF DESCRIPTIONS OF THE DRAWINGS

DETAILED DESCRIPTION

The systems and methods disclosed utilize an application of technology and security protocols to provide security for wireless-enabled devices among home, office, public, and other settings. One advantage of this new approach of the disclosed systems and methods is a reduction in the quantity of passwords and personal identification numbers (PINs) that are required for users to access the wireless-enabled devices included within the systems and methods. The systems and methods disclosed may ensure that only users with authorization can access, use, or control the devices within the system or method.

Figure 1:
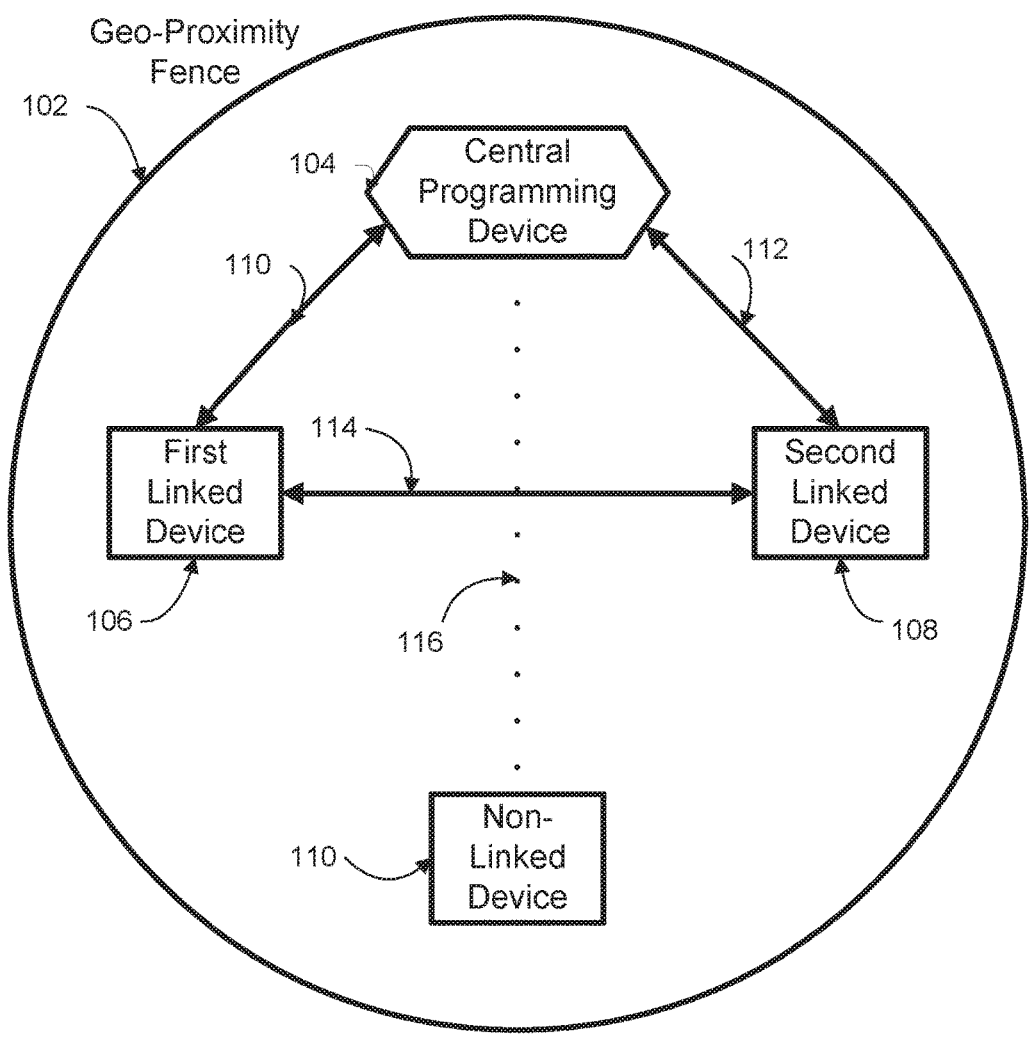
FIG. 1 illustrates an example network comprising a central programming device.

FIG. 1 illustrates an example network comprising a central programming device 104. Central programming device 104 may be either fixed at a location or mobile, allowing the central programming device 104 to be moved to a desired location of operation of the example network. In examples where the central programming device 104 is mobile, the central programming device 104 may be configured only to operate within an area, such as within geo-proximity fence 102.

Central programming device 104 may be wireless-enabled, allowing the central programming device 104 to communicate with other wireless-enabled devices and allowing tracking of the devices and objects that are within the central programming device's 104 range of communication. Central programming device 104 may communicate with other wireless-enabled devices using multiple different types of wireless communication, including any of IP, RFID, Wi-Fi, Bluetooth, near field communication, and similar communication protocols. The central programming device may further be able to determine locations of wireless-enabled devices through use of GPS, location determining systems set up within structures, RFID, Wi-Fi, Bluetooth, near field communication, or a combination thereof.

In some examples, devices that are not wireless-enabled may be converted into a wireless-enabled device through use of geo-proximity plugs. The geo-proximity plugs may be a device or object that can be connected to a device that is not wireless-enabled and, thereby, allowing the device to communicate or be recognized by the central programming device 104 and other wireless-enabled devices. The geo-proximity plugs may be discrete and not easily removed. In some examples, removal of the geo-proximity plugs may require authorization, such as through entry of a pass code, biometric certification, authorized access to the central programming device 104 to generate a removal request, or similar authorization techniques. An alert may be generated in response to unauthorized removal of a geo-proximity plug, allowing for correction of the unauthorized removal.

One example of a geo-proximity plug is by placement of an RFID tag on the device or object that is not wireless-enabled. The central programming device 104 may be configured to read RFID tags, allowing the central programming device 104 to identify any object that enters the central programming device's 104 range of communication. The RFID technology may be either encrypted or unencrypted technology.

Central programming device 104 may be configured to generate relational links between wireless-enabled devices and define rules associated with the relational links. The relational links and associated rules may define how the central programming device 104 and the linked devices operate in certain situations. In some embodiments, a relational database may be utilized, wherein the relational database stores all of the relational links and associated rules within a network.

In some examples, the relational links may be generated by a user interacting with the central programming device 104 to create a relational link between a plurality of wireless-enabled devices, such as first linked device 106 and second linked device 108. The rules associated with the relational link among the devices may be generated by the central programming device 104, the first linked device 106 or the second linked device 108, or any combination thereof. The rules may be editable by an authorized user.

In some examples, the central programming device 104 will be able to generate relational links automatically. For example, upon initialization the central programming device 104 may detect all wireless-enabled devices within its communication area and dynamically generate rules based on tracking the locations and operations of the detected devices. The central programming device 104 may be configured to track the locations and operations of the wireless-enabled devices for a selected period of time and then generate relational links and associated rules corresponding with the results of the tracking during that time period.

Further, relational links among the central programming device 104 and other linked devices may be generated based on default designations stored on one or more of the linked devices, such as first linked device 106 and second linked device 108, indicating that a relational link should be generated. The first linked device 106 may store a designation indicating that the first linked device 106 should be relationally linked to the second linked device 108. The designation may be placed on the first linked device 106 by a manufacturer of the first linked device 106, by software operating on the first linked device 106, by an operating system operating on the first linked device 106, through a network connection with the first linked device 106, or any combination thereof.

In response to the central programming device 104 detecting the first linked device 106 with the stored designation, the central programming device 104 may automatically generate a relational link between the first linked device 106 and the second linked device 108 based on the designation. In other examples, in response to detecting the first linked device 106 with the stored designation, the central programming device 104 may trigger a prompt querying whether the user wants the relational link indicated by the stored designation to be generated. The central programming device 104 will either generate the relational link of the designation or suppress the generation of the relational link of the designation based on the response of the user.

As devices are assigned relational links, the central programming device 104 may collect information regarding the devices being assigned the relational links. Some of the information that may be collected regarding the devices being assigned the relational links may include description, designation, name, intended location, current location, communication originating from the devices, or any combination thereof. This information may allow the central programming device 104 to identify the linked devices. In response to being assigned a relational link, the linked devices may each be assigned a distinct token address, enabling identification and communication with a specific linked device. The central programming device 104 may continue to collect information associated with the linked devices while they reside in the communication area of the central programming device 104. This information may be added to the database mentioned above.

Once relational links are generated, a group of linked devices, such as first linked device 106 and second linked device 108, and the central programming device 104 may be configured to communicate among each other, as illustrated by communication lines 112, 114, and 116. For example, the first linked device 106 may be configured to access data stored on the central programming device 104, the second linked device 108, or both.

Non-linked devices, such a non-linked device 110, may be prevented from communicating with the central programming device 104 and the group of linked devices. In some examples, the central programming device 104 and the group of linked devices may embed communication among themselves with additional, random bits, thereby preventing identification of the embedded communication without the receiving device having proper decoding information. The group of linked devices may be provided with the proper decoding information for identifying the embedded communication, whereas the non-linked device 110 may not be provided proper decoding information.

Central programming device 104 may further be configured to prevent the non-linked device 110 from recognizing that the group of linked devices and the central programming device 104 exist or that the central programming device 104 and the group of linked devices are communicating among themselves. In some examples, an alert may be generated in response to the non-linked device 110 entering the geo-proximity fence 102.

The central programming device 104 may generate a plurality of relational links, where each relational link may be associated with different groups of devices with each relational link having rules associated with the relational link. For example, the first linked device 106 may belong to a group of linked devices that, in response to violating an associated rule, will cause the first linked device 106 to limit access to certain functionality of the device, whereas the second linked device 108 may belong to a second group of linked devices that, in response to violating an associated rule, will lock all functionality of the device and prevent all users from accessing the device.

The rules associated with the relational links may be requested by a user of the proximity-based system or by default designations stored on one or more of the linked devices, such as first linked device 106 and second linked device 108. The user may generate a request for the rule on the central programming device 104, on any of the linked device, or any combination thereof.

The designations may indicate a rule should be associated with one or more of the linked devices. For example, the first linked device 106 may have a stored designation indicating that a rule should be defined where the first linked device 106 should be within a certain distance of the second linked device 108. The central programming device 104 may define the rule in response either to detecting the first linked device 106 or in response to detecting a relational link being generated between the first linked device 106 and the second linked device 108. In some examples, the central programming device 104 may query a user to determine whether the rule should be defined. The central programming device 104 would either define the rule or not define the rule based on the response of the user to the query.

The central programming device 104 may define rules based on tracking selected wireless-enabled devices associated by a relational link. The central programming device 104 may track the locations and operations of the selected devices and define a rule for the group of selected devices corresponding to the results of the tracking. The central programming device 104 may be configured to identify when the selected devices have violated a defined rule and determine whether to alter the rule or take remedial action, such as generating an alert, based on any of the tracking data the central programming device 104 has acquired or the severity of the violation.

An example of a rule that may be associated with a group of linked devices involves generating a geo-proximity fence 102 around the central programming device 104, such as geo-proximity fence 102. While geo-proximity fence 102 is illustrated as a circular area, it will be understood that geo-proximity fence 102 may comprise any shape and may be defined in either or both of the horizontal and vertical directions. For example, the geo-proximity fence 102 may be configured to exist with its border along the perimeter of the house, such that the area inside the house is inside the geo-proximity fence 102 and the area outside the house is outside the geo-proximity fence 102. In institutional examples, such as businesses, schools, or government buildings, the geo-proximity fence 102 may be configured to have its border along the perimeter of the institutional building, or may be limited to a portion of the institutional building, thereby allowing multiple agencies or entities to exist in one building while still securing their information from other agencies or entities in the same building.

Another example of a rule that may be associated with a group of linked devices involves defining the borders of the geo-proximity fence 102 in relation to the group of linked devices. For example, the geo-proximity fence 102 may have a border defined as a certain distance from one of the linked devices, such as the first linked device 106, within the group. It may then be determined whether the rest of the linked devices within the group are inside or outside the geo-proximity fence 102 depending on the distance of the linked devices from the first linked device 106.

A rule may define the borders of the geo-proximity fence 102 as a certain fixed area that may not include the central programming device 104 within the borders of the geo-proximity fence 102. The geo-proximity fence 102 may then be able to define a certain area as the geo-proximity fence 102, irrespective of the current locations of the central programming device 104 and the linked devices.

The borders of the geo-proximity fence 102 may be defined based on a location identifier, such as an address of a building, a name of a location or area, any other identifying label or characteristic, or any combination thereof. A user may enter the location identifier into any of the central programming device 104 or linked devices along with a request that the borders of the geo-proximity fence 102 be defined based on the building, location, area, or combination thereof, associated with the location identifier. The central programming device 104 or any of the linked devices may access a database, such as an electronic phone book or electronic maps, and set the borders of the geo-proximity fence 102 based on spatial data retrieved from the database.

The borders of the geo-proximity fence 102 may alternatively be based on a map or floorplan illustrating the desired location of the geo-proximity fence 102. The map or floorplan may be displayed to the user on one or both of the central programming device 104 and the linked devices. The user may indicate an area on the displayed map or floorplan which the user desires the borders to encompass. The indication of the area may include an indication of a room, a building, an area encompassed by rectangle or other shape generated by the user on the display of the map or floorplan, or any combination thereof. In response to the indication, the central programming device 104 may set the borders of the geo-proximity fence 102 to encompass the indicated area.

In some examples, the border of the geo-proximity fence 102 may be defined by physically moving the central programming device 104 to different locations and indicating on the central programming device 104 that the current location is intended to be a border of the geo-proximity fence 102. The border of geo-proximity fence 102 may be defined by entering coordinates or distances from an object, such as the central programming device 104, in either or both of the horizontal and vertical directions at which the border of geo-proximity fence 102 should be defined.

Figure 2:
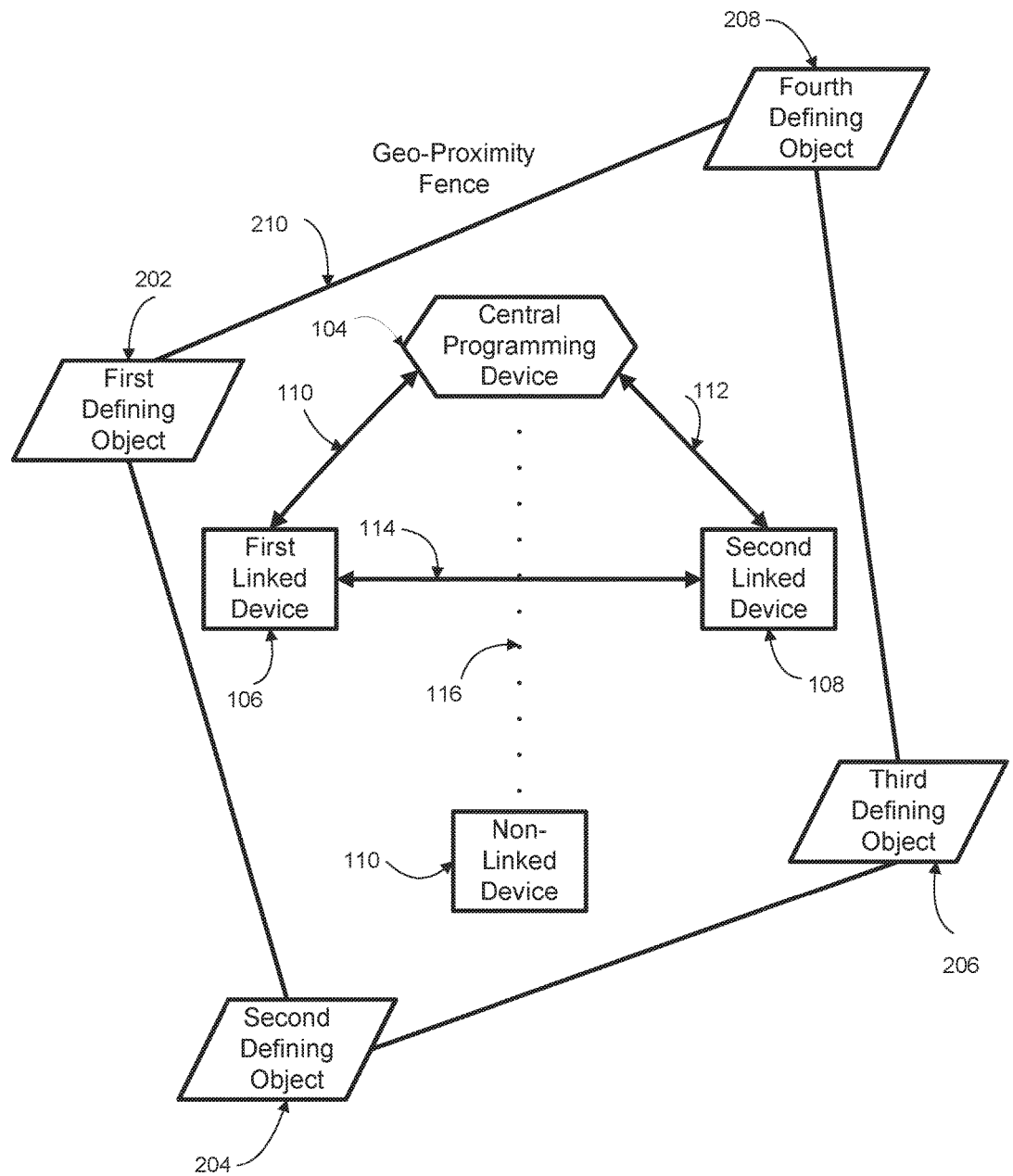
FIG. 2 illustrates an example network comprising defining objects forming a geo-proximity fence.

The border of the geo-proximity fence may also be defined by objects, such as defining objects 202, 204, 206, 208 illustrated in FIG. 2. As the defining objects 202, 204, 206, 208 move locations, the borders of the geo-proximity fence 210 may change correspondingly, thereby creating a type of boundary fencing. The objects 202, 204, 206, 208 may comprise wireless-enabled devices, objects labeled with RFID tags, or other objects that the central programming device 104 may sense the object position. Further, the defining objects 202, 204, 206, 208 may comprise devices that are not wireless-enabled, but have a geo-proximity plug, as discussed throughout this application, attached to the devices that allows the central programming device 104 to determine a location of the devices.

In some examples, a portion of the geo-proximity fence 210 may be defined by the defining objects 202, 204, 206, 208 and another portion may be defined in another manner. For example, the defining objects 202, 204, 206, 208 may define the border of the geo-proximity fence 210 in the horizontal direction, while the central programming device 104 may define the border of the geo-proximity fence 210 in the vertical direction.

Further, certain areas within a defined border of geo-proximity fence, such as geo-proximity fence 102 (FIG. 1) or geo-proximity fence 210 (FIG. 2), may be defined and labeled. For example, when the defined border of the geo-proximity fence encompasses a house, areas encompassed by each of the rooms within the house may be defined and labeled. The central programming device 104 or linked devices may define an area encompassed by the room by accessing a floor plan of the house from a database or receiving spatial parameters from a user. The central programming device 104 may further label the area with a label included in the floor plan or a label provided by the user. Accordingly, an area encompassed by a border of a geo-proximity fence may be further partitioned into one or more defined areas recognized by either or both of the central programming device 104 and the linked devices.

The central programming device 104, the linked devices within a group, or a combination of both may be configured to perform operations in response to violation of any of the rules associated with the relational links of the group. The operations may be suppressed by excusing a violation of any or all of the rules.

In response to a violation of any of the rules, an alert may be generated by the central programming device 104 or one of the linked devices in the group indicating that a rule has been violated. In some examples, the alert may include an identification of which rule has been violated. The alert may be transmitted to the central programming device 104, the linked devices in the group that did not violate the rule, or any combination thereof and the alert may be displayed on the device. In some examples, the alert may be transmitted to an electronic device outside of the linked devices, such as an electronic device associated with emergency service providers or other service providers.

The alert may be suppressed by excusing the violation of a rule either prior to the violation or in response to receiving an alert of the violation. For example, the central programming device 104 may receive an indication that the first linked device 106 is being removed from the area of the geo-proximity fence 102 and that an alert should not be generated. Proof of authorization, such as entering of a pass code or satisfying another relational link rule, may be required to indicate that an alert should not be generated in response to a violation of a rule.

The alert may further identify a location of the device that violated the rule. The identified location may help to rectify the violation. For example, if a linked device, such as first linked device 106, leaves the area enclosed by geo-proximity fence 102, a user may be able to locate the first linked device 106 and move the first linked device 106 back to within the geo-proximity fence 102. Identification of the location may also assist a user in identifying theft of any of the linked devices and recovering the stolen device.

In some examples, a linked device that violates a rule may be configured to either lock access to the linked device or provide limited functionality of the device. For example, in response to first linked device 106 being outside the area of geo-proximity fence 102, first linked device 106 may prevent a user of the first linked device 106 from accessing information stored on the central programming device 104. In some examples, a violation of a rule may lock access or provide limited functionality to a portion of the linked devices, all of the linked devices, the central programming device 104, or any combination thereof.

In response to violation of a rule, central programming device 104 may be configured to initiate a request to a third party or the linked devices to perform or not perform an action. For example, where a set of keys and a bank card have been assigned a relational link with a rule that both the set of keys and bank card should be within geo-proximity fence 102 for the bank card to complete a credit charge, if the set of keys are not within the geo-proximity fence 102 when a credit charge is attempted with the bank charge, a request may be sent to the bank to limit the purchases to a maximum value of twenty dollars.

In some examples, a linked device that violates a rule may be configured to display a message on the device in response to the violation of the rule. For example, the linked device may display "out of use area," "stolen," "lost property of 'user's name,'" or any combination thereof in response to the violation. In some examples, a transparent decal may be placed on the linked device, which appears transparent when the linked device is not violating any rules and displays a message when the linked device is violating a rule.

In some examples, a rule for a group of linked devices may allow access to information, a device, or a secured location in response to the rule being satisfied. For example, a user's cell phone and key may be linked in a group and, when the linked devices satisfy a rule of being within a certain distance of each other and a vehicle, access may be granted to the vehicle and the vehicle may be operated. In response to the rule being violated, access to the vehicle may be denied and the car may not be operated. In a further example, the vehicle may be equipped with a vehicle security system, such as Onstar, that may further authenticate the operator and, in response to failed authentication, may prevent operation of the vehicle and initiate an alert to a third party, such as customer service of the vehicle security system or law enforcement, that improper access has been gained to the vehicle. A rule may grant or restrict access to vehicles, computing systems, computing devices, telecommunications equipment, household appliances, office equipment, entry doors, elevators, operation of heavy equipment, and other areas or objects where authorization is desired for access.

In examples where greater security is desired, an activation key code, a pass code, biometric data, or any combination thereof may be added as an additional layer of protection. The activation key code or pass code may be desired where the information or area being accessed is highly sensitive. Examples where an activation key code or pass code may be desired includes healthcare information, governmental information, workstations containing information vital to commercial interests, and locations and information having great monetary value.

In some examples, the central programming device 104 may store certain information that may be accessible by a wireless-enabled device through remote access without requiring the device to have a relational link with the central programming device. Access may be gained through proof of authority to access through such authentication techniques as entry of a pass code, biometric data, or other similar authentication techniques. This type of access may allow a user to access data related to product enrollment when shopping, thereby improving the efficiency of the process of restocking items that are needed and avoiding over purchasing of items already identified as being within a geo-proximity fence associated with the user.

Further, the wireless-enabled device with remote access may be configured to request generation of relational links, request definition of rules associated with the relational links, request modification of any existing relational links or rules, or any combination thereof from a remote location. For example, a user on vacation may access the central programming device 104 through the wireless-enabled device with remote access and request a rule be modified to require higher security measures for access to a secure location or to prevent access to the secure location. This may allow a user to increase security measures while away from the proximity-based system.

A rule may be assigned that initiates an operation upon entry or exit of a linked device into the geo-proximity fence 102. In some examples, the rest of the linked devices and the central programming device 104 may be required to be within the geo-proximity fence 102 for the operation to initiate in response to the entry or exit of the linked device. Some examples of the operations that may be initiated include calling an elevator, turning on the lights in a room, and turning off the lights in a room.

In some examples, once of a violation of a rule has been rectified such that no rules are being violated, the network may automatically transition to a state of operation associated with all the rules being satisfied. For example, if first linked device 106 was outside geo-proximity fence 102 which resulted in violation of a rule preventing access to the device, once the first linked device reentered the geo-proximity fence 102 the first linked device may automatically regain full functionality. In other examples, a pass code entry may be required before regaining full functionality after rectifying all rule violations.

Figure 3:
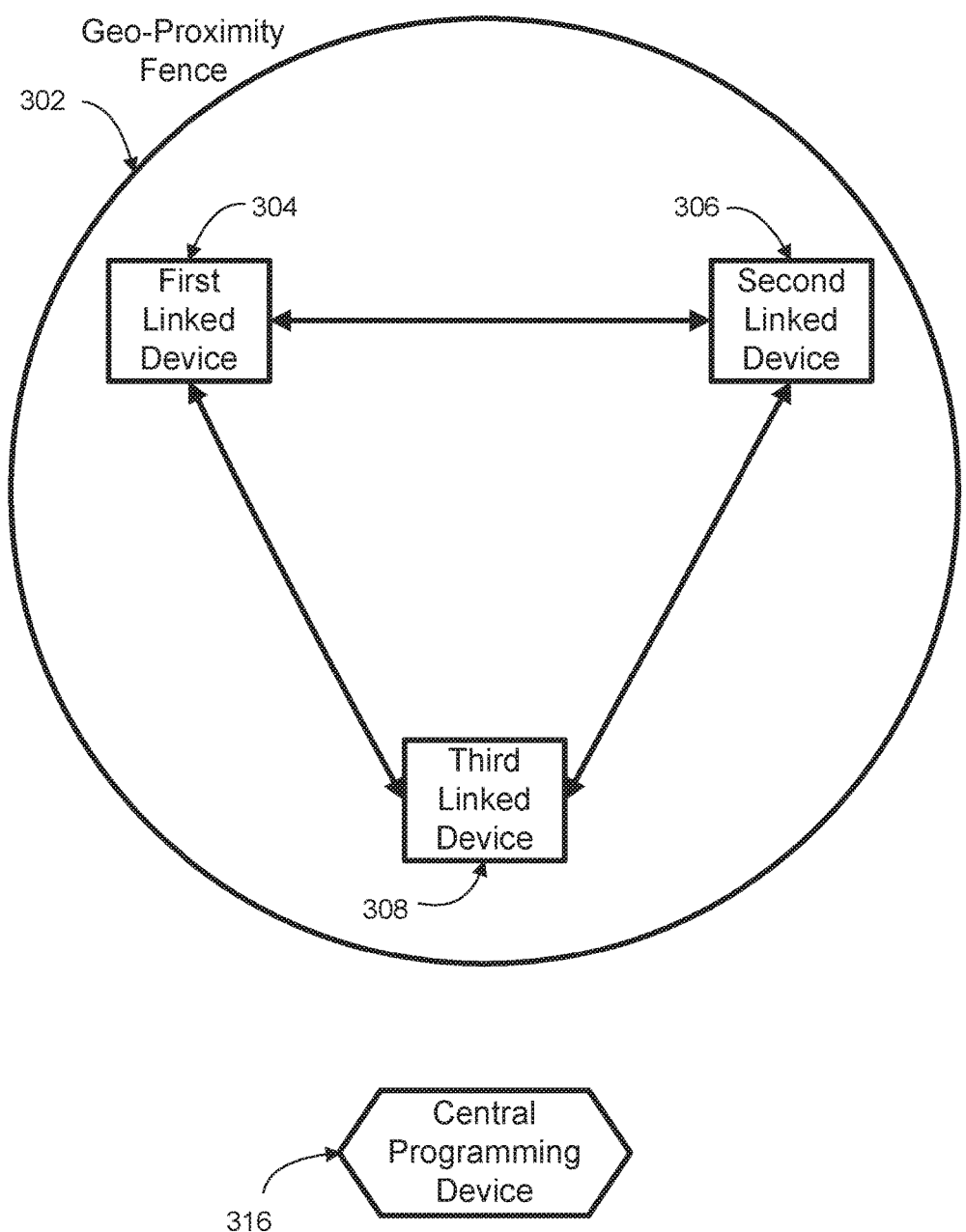
FIG. 3 illustrates an example network comprising linked devices.

FIG. 3 illustrates an example network comprising linked devices. In this example network, there may be no central programming device 104 (FIG. 1) or the central programming device 104 may not be part of the linked group. In this network, one of the linked devices, such as first linked device 304 may act as a token performing the operations of the central programming device 104 (FIG. 1). In some examples, the token may perform the monitoring operations of the central programming device 104 (FIG. 1) and a central programming device 316 separate from the linked group may perform the operations of assigning the web-enabled devices with relational links, defining rules for the group of linked devices, or any combination thereof. The token may be configured to perform any portion of the operations performed by central programming device 104 (FIG. 1) and the remainder of the operations may be performed by central programming device 316.

The token may comprise an object associated with a root authorization (subnet) address that may support stationary architectures, mobile architectures, or both. A token assignment may be generated by the central programming device 316. The token may be able to collect information from the linked devices and store the information for later access or use the information to perform operations, such as tracking the linked devices and determining if a rule is satisfied.

Geo-proximity fence 302 may be defined in relation to the first linked device 304 operating as a token. For example, the border of geo-proximity fence 302 may be set to a certain distance from first linked device 304. In the example situation, second linked device 306 and third linked device 308 may be required to be within the border of geo-proximity fence 302 to satisfy a defined rule. In some examples, the second linked device 306 and the third linked device 308 may be configured to function minimally or not at all when the devices are outside of geo-proximity fence 302. Upon reentry into the border of geo-proximity fence 302, the second linked device 306 and the third linked device 308 may automatically return to normal operation or may require entry of a pass code to return to normal operation upon reentry.

Figure 4:
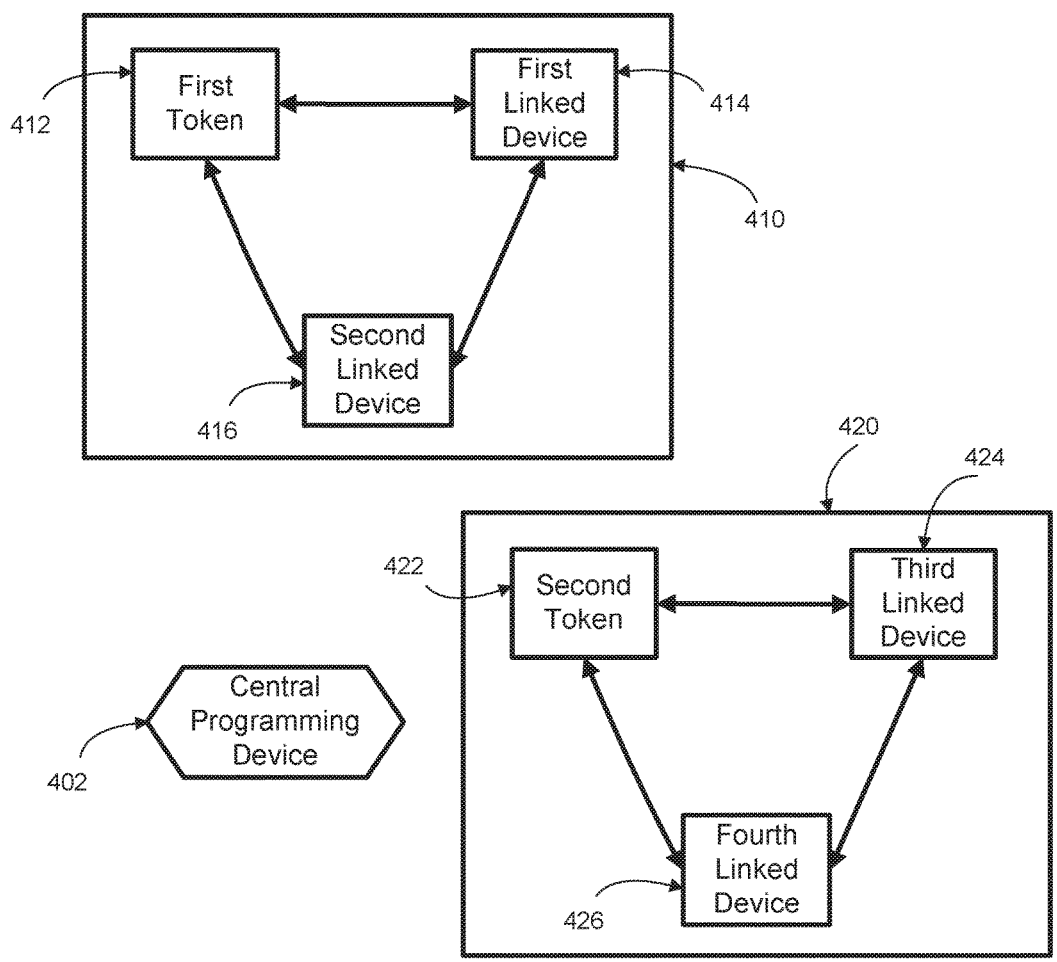
FIG. 4 illustrates an example network comprising a first token and a second token.

FIG. 4 illustrates an example network comprising a first token 412 and a second token 422. A network may be configured to have multiple tokens. Each token may be assigned relational links to a group of wireless-enabled devices. The group of wireless-enabled devices assigned to a token may comprise devices that are not relationally linked with any other token or the devices may share relational links with multiple tokens.

Where multiple tokens have been assigned, the token and group of associated wireless-enabled devices may be utilized to identify a user associated with the token. First token 412, first linked device 414, and second linked device 416 may comprise a first linked group associated with a first user 410, whereas second token 422, third linked device 424, and fourth linked device 426 may comprise a second linked group associated with a second user 420. In examples where the linked group may provide access to secured data or a location, it may be determined which user is gaining access based on which group of linked devices was satisfying the rule allowing access at the time access was granted.

In some examples, central programming device 402 may determine which user was granted access to the secured data or location. The central programming device 402 may generate a log of users who accessed the secured data or location. The log may be reviewed at a later time to determine who accessed the secured data or location at a given time and may be used to determine who performed an unauthorized activity.

In networks configured for multiple tokens, a master account option may exist allowing control over rules, relational links, information, or any combination thereof associated with all, or a portion, of the tokens. The master account option may allow the central programming device 402 to act as an administrator granting or denying access to a token associated with a particular user.

Any of the examples disclosed may allow the central programming device to be physically reset. The physical reset may operate to reset the relational links, the rules associated with the relational links, the assignment of tokens, or any combination thereof. The physical reset may be useful where a user has forgotten a pass code for access to the central programming device or would like to start fresh in generating the relational links.

In response to the physical reset, central programming device may allow a selection of several options. These options may comprise ending the geo-proximity lock, removing the token and making the central programming device the token, allowing another linked device to serve as the token, allowing two or more devices to pair as a field that allows their use while outside of the geo-proximity location, or any combination thereof.

Figure 5:
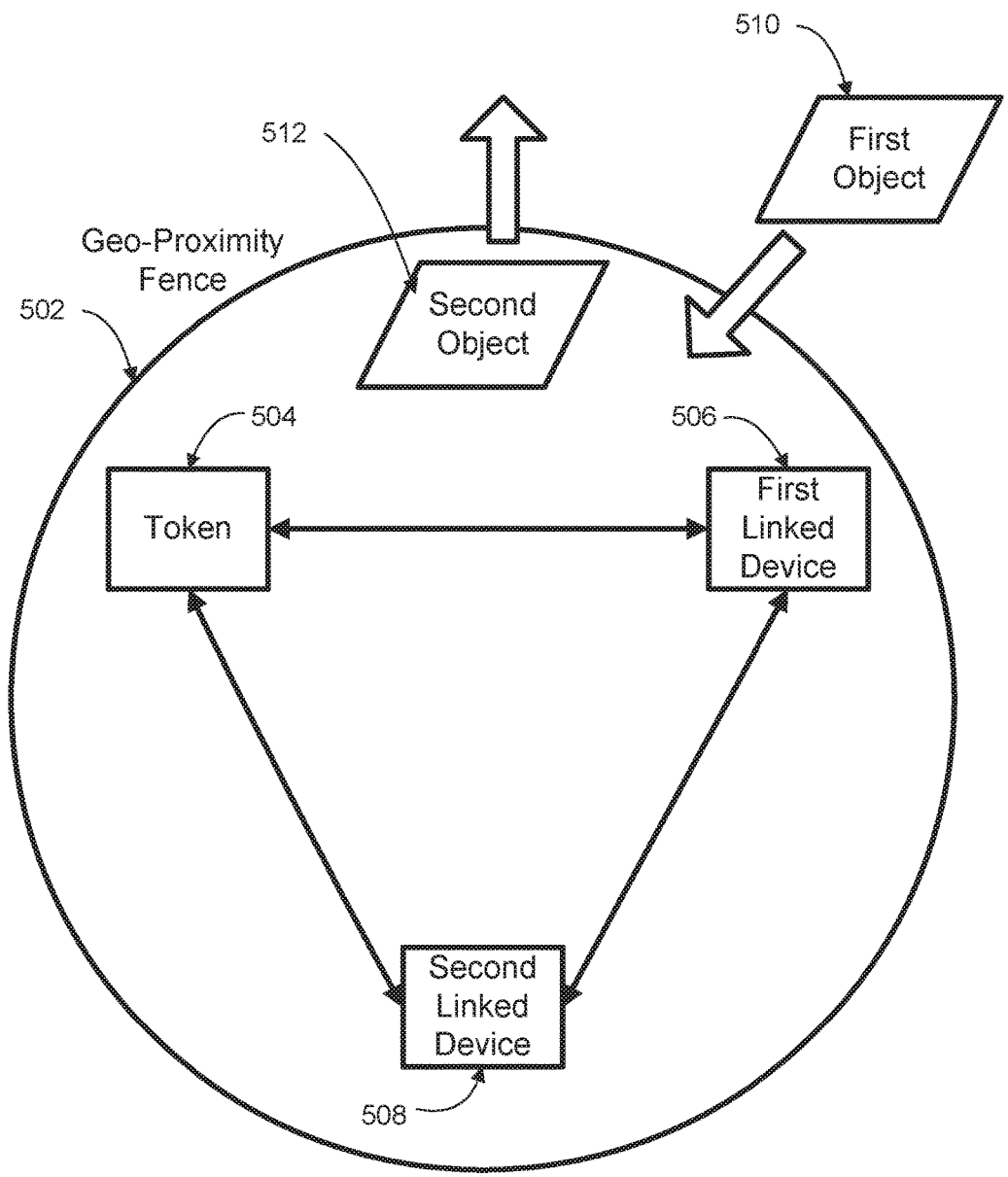
FIG. 5 illustrates an example network tracking objects entering a geo-proximity fence associated with a token.

FIG. 5 illustrates an example network tracking objects entering a geo-proximity fence 502 associated with a token 504. Token 504 may have relational links with wireless-enabled devices, such as first linked device 506 and second linked device 508. In some examples, token 504 may be configured to track objects entering and exiting the geo-proximity fence 502 when all rules associated with group of linked objects are satisfied and configured not to track the objects when any of the rules are being violated.

First object 510 and second object 512 may be moved into and out of the geo-proximity fence 502. Both the first object 510 and the second object 512 may be assigned distinct token addresses upon entry into the geo-proximity fence 502. The token addresses may be used for tracking the first object 510 and the second object 512 while each is located within the geo-proximity fence 502.

Alerts may be generated in response to any of the objects entering or exiting the geo-proximity fence 502. For example, the first object 510 enters the geo-proximity fence 502. In response to entering the geo-proximity fence, information associated with the first object 510 may be captured or recorded by the token 504 and an alert may be generated indicating a new object has entered the geo-proximity fence 502. The second object 512 exits the geo-proximity fence 502. In response to exiting the geo-proximity fence 502, information associated with the second object may be captured or recorded and an alert may be generated indicating the second object 512 exited the geo-proximity fence 502.

While in the geo-proximity fence 502, the first object 510 and the second object 512 may be tracked. A record of the objects within the geo-proximity fence 502 may be maintained and accessed. One example where the record may be useful is when a user is trying to determine whether a particular bathroom, enabled with a geo-proximity fence 502, has hand soap and the amount of hand soap that is present. Information, such as location, state, or any combination thereof of an object, may be gathered while the object is within the geo-proximity fence 502. This data may be stored in a database.

In some examples, information about an object may be provided by a third party, such as retailers, wholesalers, and manufacturers. For example, a retailer may provide an expiration date associated with a carton of milk. Upon entry of the carton of milk into the geo-proximity fence, a reminder may be generated for the expiration date and an alert may be generated if the carton of milk remains in the geo-proximity fence 502 past the expiration date.

Further, the information about the object may include a purpose or a function of the object. A user may also be able to define the purpose or function of the object if not included in the information, or may alter the purpose or function of the object acquired from the information.

The proximity-based system may determine an expected location of the object based on the purpose or function of the object. For example, the object may be toothpaste, which has a defined function of being used for brushing teeth, and, accordingly will have an expected location of being within a defined bathroom partition of the geo-proximity fence 502 associated with a user brushing his teeth.

In some examples, the user may define an expected location corresponding to the purpose or function of the object. The proximity-based system may then be able to determine the expected location of the object based on the purpose or function of the object and the user-defined expected location corresponding to the purpose or function.

In response to detecting that an object is outside of its expected location, the proximity-based system may generate an alert on any, or a combination, of the central processing device, token, or linked devices indicating the object should be returned to its expected location. A user may then return the object to the expected position causing the alert to cease or the user may excuse the alert, thereby ceasing the alert.

In some examples, the user may request indication of a location of a certain object. The user may input a label associated with the certain object into any, or a combination, of the central processing device or linked devices and request from the proximity-based system an indication of the location of the certain object. In response, the proximity-based system may return the location of the certain object based on tracking of the object by the proximity-based system. In examples where the proximity-based system has not been tracking or is unable to access tracking information concerning the object for some reason, the proximity-based system may return the expected location based on the purpose or function of the object. The location may then be displayed to the user on the device generating the request for the indication of the location.

One method of tracking objects is through passive radio frequency identification (RFID) technology. The central programming device, token, or both may incorporate RFID tag reading capability. RFID tags may be placed on objects, thereby allowing identification of the object. Any object labeled with an RFID tag may perform some of the same functions as the wireless-enabled devices discussed throughout this specification. The RFID tags may contain information regarding the object, which may be read by the central programming device or the token. The central programming device, the token, or both may be configured to link with commercially available RFID readers to allow upload of data to the central programming device or the token.

RFID tags may allow objects brought into the geo-proximity fence 502 to have their locations mapped. Information associated with an object may be communicated by the RFID tags. The information may include when an object is discarded or when expiration dates are exceeded. An alert may be generated in response to the discarding or the expiration date being exceeded.

The RFID tag may contain information allowing the object to be matched with objects within a directory of RFID consumer product information, making the process or enrollment of the object when entering the geo-proximity fence 502 easier. In some examples, a directory of manufacturer skew codes may be stored or accessible by a central programming device also simplifying the process or enrollment of an object entering the geo-proximity fence 502.

The network, when linked to items such as the RFID and SKU codes on wrappers, containers for food or appliances, may manage product use and consumption life cycle of an object. Reports may be generated from the measured product use and consumption life cycle of an object. Further, it may be predetermined which object would be of such importance that reminders are required to be sent to prompt for replacement of the discarded object.

The central programming device or token may be configured to gather and store all information and data obtained during operation, including information and data related to the linked devices and the objects. The information and data may be analyzed and used to generate reports that may be used for such things as determining consumption of the objects, use of the linked devices and the objects, and movement of the linked devices and the objects. In some examples, the central programming device or token may be configured to analyze a selected portion of the gathered information and data. The gathering and storing of the information and data may be beneficial in accounting of consumable goods, determining depreciation of equipment, and determining what equipment is used, how often the equipment is used, how the equipment is used, and where the equipment is used. Routines may be identified from the analyzed information and data, and the network configuration may be optimized based on the identified routines.

In some examples, the stored information and data regarding enrollment, removal of items, and changes in token status or assignments may be retained unless an authorized request is received. The authorized request may be required to be initiated by a particular central programming device or token, or by a user with an authorized pass code. The request may indicate which portions of the stored information and data should be erased, while the non-indicated information and data is retained. This indication may be beneficial in managing consumables, such as food, cleaning supplies, equipment, and clothing, while allowing a user to erase sensitive, personal or proprietary information.

Figure 6:
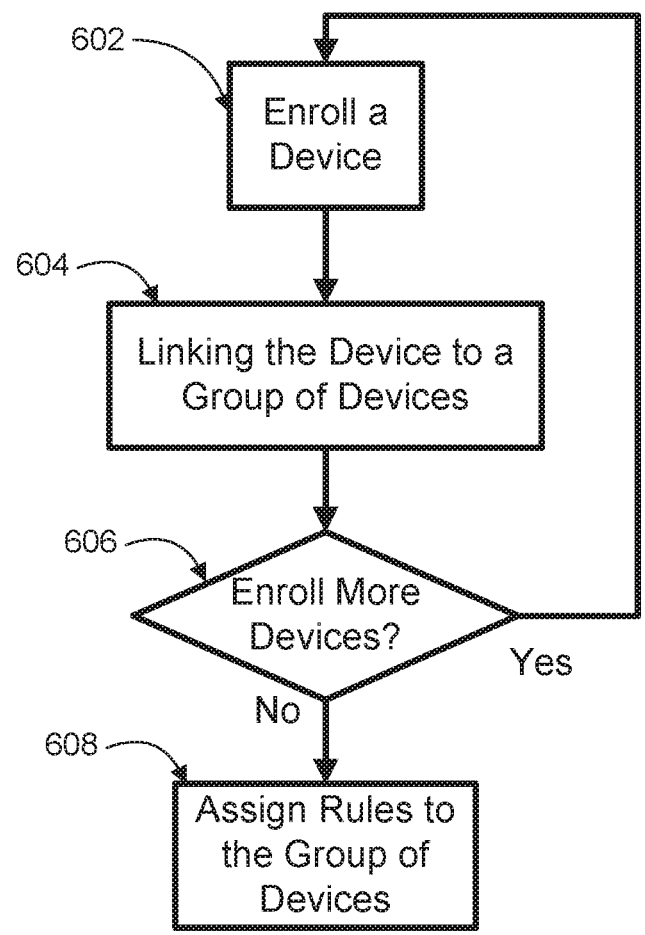
FIG. 6 is a flow chart illustrating a process for linking devices.

FIG. 6 is a flow chart illustrating the process of generating a group of linked devices. Step 602 begins by enrolling a wireless-enabled device. The process of enrolling a device may comprise communicating with the wireless-enabled device and assigning the wireless-enabled device a unique address, such as a unique IPV6 address.

Step 604 generates a relational link between the enrolled wireless-enabled device and a group of one or more other devices. Step 606 checks if there are more wireless-enabled devices to be enrolled and repeats steps 602 and 604 for the new device. Once enrolling of the devices has been completed, one or more rules may be assigned to each group of linked devices in step 608. Step 608 may include the process of generating a geo-proximity fence if necessary to enforce the rule. Every relational link within a group of devices is dynamic such that a new wireless-enabled device can be added to a group of linked devices by repeating the process at any time.

Some additional illustrative examples of rules may include the following. Rules Type 1 for Secure Access Control:

In this example, access to a particular work computer is controlled. For this purpose, multiple wireless-enabled devices may be linked. For example, a company-issued mobile device like a smartphone may associated with the work computer. In addition, a user's company-issued wireless-enabled ID Badge (NFC, BT, pin-chip, etc.) may be associated with the work computer.

The computer to be secured may be linked to the smartphone; conversely, the smartphone may be assigned to that specific computer. Rules may be implemented in various combinations. In one example, the computer is the control device for the smartphone, and the smartphone is the control for the ID Badge. In other cases, the ID Badge may be enabled or operable only while within a predetermined physical proximity of the smartphone. Any device may be required to be present to enable any other device. Two or more devices may be grouped as described so than each one is locked without the other(s) present (within proximity range). A range of access purposes for an office can be enabled using the smartphone and ID Badge when paired with another device or item. For example, a Rule may Control access to a copier while also assigning the copies made to a log.

Another Rule may limit the distance that one device can physically be from the other for the two to function as a component of a key. For example, my ID Badge, only while sufficiently close to my smartphone, may enable unlocking or operating a motor vehicle.

Rules Type 2 Mapping an area for tracking items.

Step 1—Create a virtual boundary using programmable tags that are assigned to a central programming unit.

Step 2—Tags are assigned a name that could be an area: living room, den, bedroom master, bedroom children, bathroom etc.

Step 3—place tags—tags with the same address e.g. master bedroom.

Step 4—items in proximity of the addressed tags are catalogued as being in that address location.

Step 5—Items in each location can be tagged with unique information.

Finding keys with an existing item identifier or one created by the user. The keyring is logged by the programming unit.

The user asks the system where the keys are. Based on the address spaces in the area and the tag nearest the keyring the information is provided. "Couch living room."

Rules Type-3—The "one foot rule" for small, tagged items linked to a mobile device. An umbrella is linked to a mobile digital device. The rule is 1 foot and if broken the sound of thunder communicates that the umbrella is outside of the rule. In other words, the user is about to leave the umbrella in the restaurant or elsewhere. Loss is prevented.

If the control device is a smartphone and it was being left, it can trigger a "please don't leave me" message in the user's pre-recorded voice.

Figure 7:
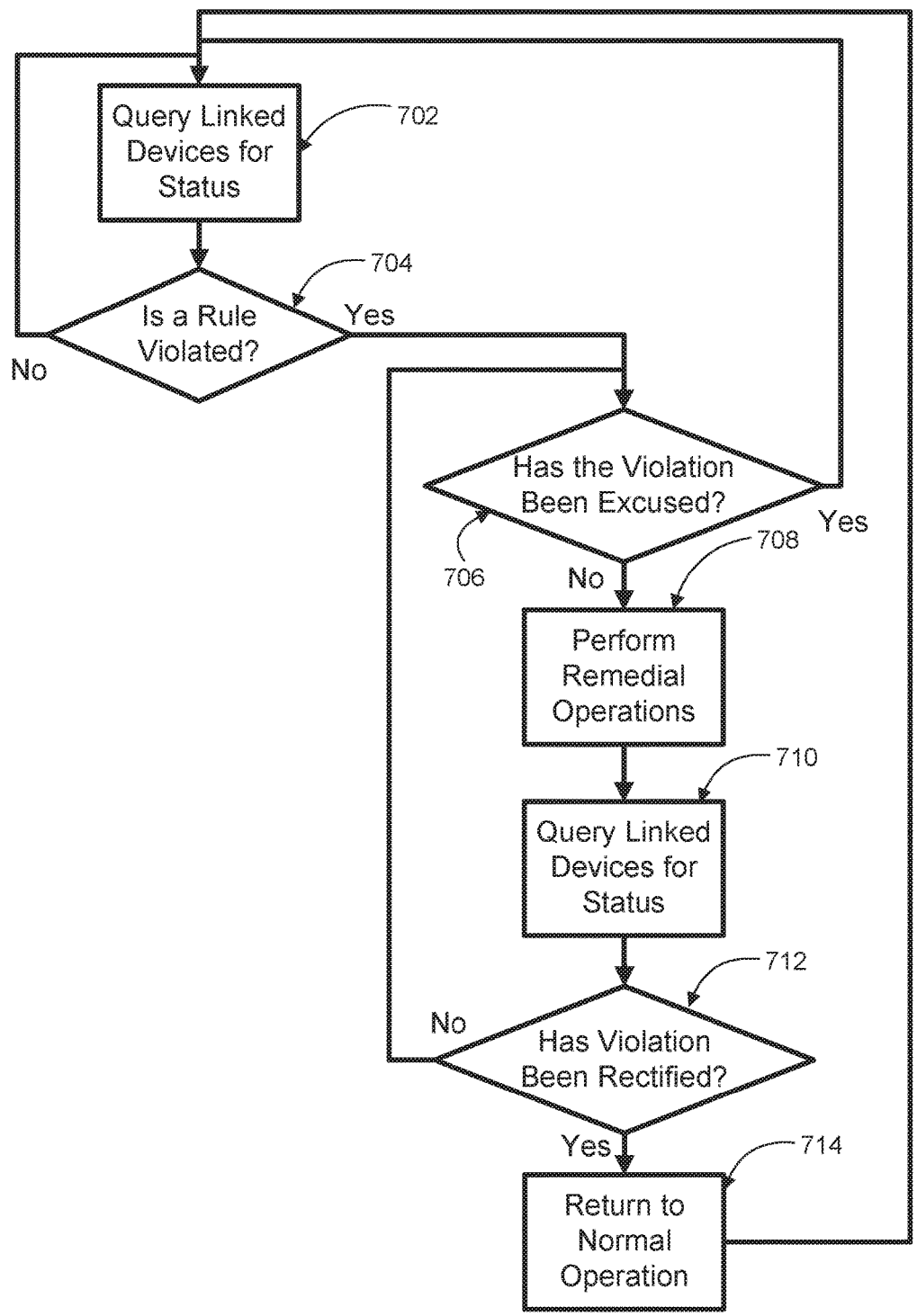
FIG. 7 is a flow chart illustrating the process of monitoring a group of linked devices.

FIG. 7 is a flow chart illustrating the process of monitoring a group of linked devices. At step 702, a central programming device or token queries a group of linked devices for current status. The queries may be continuously performed, performed at specified intervals, performed upon request, or any combination thereof. Status information may include, but is not limited to, the location of the queried device, current operation of the device, historical operation of the device, and a log of operators who have accessed the device.

In step 704, the central programming device or token determines whether a rule has been violated based on the status information. If no rule has been violated, the flow returns to step 702 and continues querying the linked devices. If a rule has been violated, the flow continues to step 706 where the central programming device or the token determines if the violation has been excused. If the violation has been excused, the flow returns to step 702 and continues querying the linked devices.

If a rule has been violated and the violation has not been excused, the flow continues to step 708 where the central programming device or the token performs remedial operations. The remedial operations may comprise any one or a combination of the operations discussed above in response to a violation, including generating an alert.

The flow continues to step 710 where the current status of the linked devices is queried. In step 712, the central programming device or the token determines if the violation has been rectified. If the violation has not been rectified, the flow will return to step 706, wherein the network will again check if the violation has been excused after the remedial operations have been performed. If the violation has been rectified, the flow will continue to step 714 where the group of linked devices and the central programming device or token will reenter normal operation.

It will be obvious to those having skill in the art that many changes may be made to the details of the above-described embodiments without departing from the underlying principles of the invention.

The invention claimed is:

1. A central programming device, comprising:
   a processing device;
   a memory device having instructions stored thereon, wherein the instructions, in response to execution by the processing device, cause the processing device to:
   identify a plurality of wireless-enabled devices;
   assign a relational link among at least two of the plurality of wireless-enabled devices;
   generate a geo-proximity fence that encompasses an area;
   define a rule for the at least two wireless-enabled devices, the rule based, at least in part, on positions of the at least two wireless-enabled devices relative to the geo-proximity fence;
   determine, based on the positions of the at least two wireless-enabled devices relative to the geo-proximity fence, whether the rule is satisfied; and
   grant, in response to determining that the rule is satisfied, access to secure data or to a secure location.

2. The central programming device of claim 1, wherein, to determine whether the rule is satisfied, the instructions, in response to execution by the processing device, cause the processing device to:
   query the at least two wireless-enabled devices for the positions of the at least two wireless-enabled devices; and
   compare the positions of the at least two wireless-enabled devices to the area encompassed by the geo-proximity fence.

3. The central programming device of claim 1, wherein the rule is satisfied by the positions of the at least two wireless-enabled devices being within the area encompassed by the geo-proximity fence.

4. The central programming device of claim 1, wherein the at least two wireless-enabled devices are associated with a user, and wherein the instructions, in response to execution by the processing device, further cause the processing device to:
   determine, in response to granting access to the secure data or to the secure location, the user based on the at least two wireless-enabled devices; and
   add the user to a log of users that accessed the secure data or the secure location.

5. The central programming device of claim 1, wherein the instructions, in response to execution by the processing device, further cause the processing device to:
   in response to determining that the rule is not satisfied, limit functionality of the at least two wireless-enabled devices.

6. A central programming device, comprising:
a processing device; and
a memory device having instructions stored thereon, wherein the instructions, in response to execution by the processing device, cause the processing device to:
 detect a plurality of wireless-enabled devices within a communication area of the central programming device;
 track locations and operations of the plurality of wireless-enabled devices during an initialization period;
 generate, in response to termination of the initialization period, a relational link among at least two wireless-enabled devices of the plurality of wireless-enabled devices based on the tracked locations and the tracked operations of the plurality of wireless-enabled devices; and
 generate, in response to generation of the relational link among the at least two wireless-enabled devices, a rule for the at least two wireless-enabled devices based on the tracked locations and the tracked operations of the plurality of wireless-enabled devices.

7. The central programming device of claim 6, wherein the instructions, in response to execution by the processing device, further cause the processing device to:
 generate a geo-proximity fence based, at least in part, on the tracked locations, wherein the geo-proximity fence encompasses an area, and wherein the rule defines an operation to be performed by the central programming device based, at least in part, on post-initialization period locations of the at least two wireless-enabled devices as compared to the area encompassed by the geo-proximity fence.

8. The central programming device of claim 7, wherein the geo-proximity fence encompasses one of the at least two wireless-enabled devices, and wherein a border of the geo-proximity fence is a certain distance from the one of the at least two wireless-enabled devices.

9. The central programming device of claim 7, wherein the instructions, in response to execution by the processing device, further cause the processing device to:
 query, after the initialization period, the at least two wireless-enabled devices for the post-initialization period locations of the at least two wireless-enabled devices;
 compare the post-initialization period locations to the area encompassed by the geo-proximity fence;
 determine whether the at least two wireless-enabled devices are within the area based on the comparison; and
 perform the operation based on the determination of whether the at least two wireless-enabled devices are within the area.

10. The central programming device of claim 9, wherein the processing device determines that the at least two wireless-enabled devices are within the area, and wherein the operation includes granting access to secure data or to a secure location in response to determining that the at least two wireless-enabled devices are within the area.

11. The central programming device of claim 9, wherein the processing device determines that one or more of the at least two wireless-enabled devices are outside of the area, and wherein the operation includes limiting functionality of the one or more of the at least two wireless-enabled devices in response to determining that the one or more of the at least two wireless-enabled devices are outside of the area.

12. The central programming device of claim 11, wherein the operation further includes identifying locations of the one or more of the at least two wireless-enabled devices that are outside of the area.

13. The central programming device of claim 11, wherein the operation further includes displaying a message on the one or more of the at least two wireless-enabled devices that are outside of the area.

14. The central programming device of claim 6, wherein the instructions, in response to execution by the processing device, further cause the processing device to:
 authenticate a certain wireless-enabled device of the at least two wireless-enabled devices based on proof of authority received from the certain wireless-enabled device;
 identify a request to modify the rule received from the certain wireless-enabled device; and
 modify the rule based on the request.

15. The central programming device of claim 14, wherein the proof of authority includes entry of an authorized pass code or authorized biometric data.

* * * * *